2,773,800

RABIES VACCINE PRODUCTION

Horace M. Powell, Indianapolis, Ind., assignor to Eli Lilly and Company, Indianapolis, Ind., a corporation of Indiana No Drawing. Application April 28, 1953,
Serial No. 351,729

2 Claims. (Cl. 167—78)

This is a continuation-in-part of my application Serial No. 159,373, filed May 1, 1950, now abandoned.

My invention relates to vaccines, and more particularly to a novel rabies vaccine and its preparation.

Since the preparation of the first rabies vaccine by Pasteur in 1885, rabies vaccine have commonly been prepared by infecting a living animal with rabies virus (usually a fixed virus prepared by serial passage through rabbits of street or virulent rabies), permitting the virus to develop in the animal, and after the animal has exhibited the characteristic symptoms of rabies, sacrificing the animal, removing its brain and spinal cord, subjecting them to virus-killing or attenuating conditions, and processing them into a form suitable for therapeutic administration. Vaccines prepared in this general manner are currently being used, and differ from each other only with respect to the particular species of animal used for the propagation of the virus and the method employed for killing or attenuating the virus present in the animal's brain and spinal cord.

The present vaccines, however, are characterized by the presence of some factor or agent which all too frequently produces in the person treated with the vaccine a post-vaccinial, neurolytic paralysis, often with fatal consequences. The origin of this factor, called the neuroparalytic factor, is not known with certainty, but it is generally believed to arise from some constituent present in the mammalian nerve tissue which, because of the method of preparation, is inevitably present in the vaccine.

An object of my invention is to provide a rabies vaccine free from the post-vaccinial paralysis factor. Another object is to provide a novel and simplified method of preparing rabies vaccine. Other objects will be apparent from the following description of my invention.

In 1941, I. J. Kligler and Hans Berkopf published an article in the American Journal of Hygiene on the cultivation of rabies virus in chicken eggs. However, the vaccine thus produced by those authors had a low antigenicity and was unsuitable for human immunization.

I have discovered that I can obtain rabies vaccine in a simple, efficient manner by propagating fixed rabies virus in embryonated duck eggs for a period of time, removing the partially developed embryos, and processing them into a form suitable for administration as a vaccine. The vaccine so prepared, in contrast to the Kligler et al. vaccine, is characterized by a high potency. Moreover, the vaccine is free from the neuroparalytic factor, and when administered does not cause side reactions as are commonly observed when rabbit brain vaccine is administered.

Broadly speaking, my new vaccine is prepared as follows: Duck eggs are incubated for a time sufficient to produce a recognizable duck embryo, an incubation period of about 7 days being sufficient. Fixed rabies seed virus is injected into the embryonic area or, more specifically into the periembryonic fluid and the eggs are maintained at incubation temperature for a further period of time, for example, from 7 to 16 days. At the end of the latter incubation period, the eggs are opened and the embryos, that is the organized embryonic cellular tissue, as distinguished from periembryonic fluid and membrane, are recovered under sterile conditions. The separated embryo body tissues are ground, as in a mechanical blender, for a short time with water or preferably physiological salt solution, to obtain a finely divided suspension of the soft tissues of the embryos. The fine suspension of soft tissues is separated from the unground, hard or horny tissues and any other coarse particles, as by centrifugating, and the virus contained in the suspension is inactivated or attenuated to make it suitable for use as a vaccine. The inactivation or attenuation is accomplished by irradiation with ultra-violet light, by chemical means as by the addition of ether, phenol, or the like, or by any other of the methods used for the preparation of rabies virus vaccines from brain and spinal cord tissue.

The suspension obtained by grinding the infected duck embryo is highly virulent and has a very high titer of rabies virus. When tested by intracerebral inoculation in mice, the ground embryonic material has been found to have a titer as high as $10^{-6}$.

The seed virus used for the inoculation of the duck eggs can be any one of the strains of fixed rabies virus commonly available in the laboratory, but preferably is a strain of fixed rabies virus obtainable from the National Institute of Health, which has been carried by serial passage in rabbits or mice. The seed virus is prepared for inoculation of the embryos by making a suspension of infected rabbit or mouse brain in the usual manner. Suspensions of the live virus obtained by grinding the embryos of infected duck eggs can also be used for the initial inoculation, but I prefer not to use such material after its third serial passage through duck eggs because of the danger of antigenic modification of the virus.

The following example illustrates more fully a preferred manner of carrying out my invention.

Two dozen fertile duck eggs are incubated for 7 days at about 37° C. The embryos in the eggs are inoculated with 0.2 cc. of $10^{-2}$ dilution of a seed virus obtained by mouse brain passage of a strain of rabies virus obtained from the National Institute of Health. The embryos are injected under sterile conditions in the periembryonic fluid, in the same manner as hen eggs are injected in the preparation of influenza virus vaccine. An area on the large end of each egg is sterilized by painting it with a germicidal agent and puncture hole is made in each egg using a sterile needle, and by means of a hypodermic syringe the seed virus is injected into the periembryonic fluid. The opening in each egg is sealed with paraffin wax, and the inoculated eggs are incubated for 14 days at 35° C. At the end of the incubation period the viable eggs are selected by candling, the upper part of the shells of the viable eggs is removed, and the embryo bodies are recovered and pooled in groups of six. The pooled embryos are tested for bacterial sterility by inoculation with pooled embryonic material of both rabbit blood agar slants and thioglycollate broth tubes. The bacteria-free embryos are weighed, and are comminuted by grinding them for three minutes in a liquidizing grinder with a sufficient amount of physiological salt solution to make a 1 to 10 dilution. About 35 grams of embryonic material are recovered from each batch of pooled embryos, so that the total volume of the suspension is about 350 cc. The suspension thus obtained is centrifuged for 5 minutes to remove coarse particles, and unground tissue, and the centrifugate is exposed to ultraviolet light to attenuate the virus. The proper amount of exposure to ultraviolet light is determined by irradiating the suspension of embryonic material for increasing time increments and inoculating mice intracerebrally after each exposure until the suspension no longer causes symptoms of rabies in the mice so injected. By way of example, proper inactivation is obtained by using a 30-inch ultraviolet-producing sterilizing lamp, and allowing the suspension to pass through a tube rapidly rotated about the lamp as an axis at the rate of about 300 cc. per minute, the interior surface of the tube being about 2.5 cm. from the lamp. The suspension containing the inactivated virus meets the test requirements of the National Institute of Health, and is an effective vaccine capable of producing immunity to virulent rabies virus.

The above specific example is given for ilustrative purposes only, the modifications of the above procedure which do not depart from the scope of this invention will be readily apparent to those skilled in the art.

I claim:

1. The method of preparing a rabies vaccine which comprises infecting duck embryos with fixed rabies virus, incubating the eggs for a period of time, separating the embryo cell tissue from the eggs, and attenuating the rabies virus in said embryo tissue.

2. The method of preparing a rabies vaccine which comprises incubating a fertile duck egg to obtain a recognizable duck embryo, injecting under sterile conditions the periembryonic fluid of said embryo with a fixed rabies seed virus, incubating said egg to cause development of said embryo and the propagation of the rabies virus therein, separating the developed embryo cellular tissue, and grinding said embryo tissue with physiological salt solution to obtain an aqueous suspension of said tissue, and attenuating the rabies virus in said ground tissue.

References Cited in the file of this patent

UNITED STATES PATENTS

| | | |
|---|---|---|
| 2,421,382 | Levinson | June 3, 1947 |
| 2,506,345 | Cox | May 2, 1950 |

OTHER REFERENCES

J. Am. Vet. Med. Assn., November 1949, on Virus Diseases of Birds, p. 373.

J. A. M. A., Feb. 24, 1945, p. 492.

Wright: in Science, July 30, 1948, pages 118, 119.

Am. J. of Pharm., November 1950, p. 440.

J. A. M. A., Oct. 16, 1948, pp. 531 and 532.

Peck et al.: J. of Lab. and Clin. Med., vol. 45, No. 5, pages 679–683, May 1955.

Kliger: in J. A. P. A., Sci. Ed., October 1942, p. 295.

Kliger: in Proc. Soc. Exp. Biol. & Med., vol. 45, 1940, pp. 332–335.

Sabban: in Proc. Soc. Expl. Biol. & Med., July 1949, pp. 423–429.

Beveridge: "The Cultivation of Viruses and Rickettsiae in the Chick Embryo," London, 1946, p. 67.